United States Patent [19]

Erickson et al.

[11] 4,280,662
[45] Jul. 28, 1981

[54] EROSION RESISTANT JET PUMP AND METHOD OF MAKING SAME

[75] Inventors: John W. Erickson, Huntington Beach; Harold L. Petrie, Sierra Madre, both of Calif.

[73] Assignee: Kobe, Inc., Commerce, Calif.

[21] Appl. No.: 95,763

[22] Filed: Nov. 16, 1979

[51] Int. Cl.³ .............................................. B05B 15/00
[52] U.S. Cl. .................................................. 239/591
[58] Field of Search ....... 239/589, 591, 600, DIG. 19; 29/157 C, 447, 460, 527.2, 557; 417/195, 151, 183, 172

[56] References Cited

U.S. PATENT DOCUMENTS 3,545,679  12/1970  McAllister et al. ................... 239/591
3,776,472  12/1973  Lock et al. ............................ 239/591

Primary Examiner—James B. Marbert
Attorney, Agent, or Firm—William C. Norvell, Jr.

[57] ABSTRACT

This invention provides an improved jet pump having a Venturi chamber defined by a coating of a ceramic or alloy material that is highly resistant to both stress and erosion. The coating is applied by the chemical vapor technique upon a heated substrate of graphite. The graphite is then removed to conform in configuration to that of the coating and reduce the graphite substrate to a thickness of less than 0.010 inches. A mass of low melting, high elastic modulus material is then cast around the graphite substrate with the coating adhered thereto to define an exterior cylindrical configuration. The cylindrical mass is then encased by heat shrinking within a jacket of steel or other similar low modulus, high tensile strength material so as to produce a significant compressive force in the coating.

8 Claims, 2 Drawing Figures

EROSION RESISTANT JET PUMP AND METHOD OF MAKING SAME

BACKGROUND OF THE INVENTION

1. FIELD OF THE INVENTION

The present invention relates in general to jet pumps and, in particular, to jet pumps having a Venturi chamber with a high erosion resistant surface coating.

2. DESCRIPTION OF THE PRIOR ART

Jet pumps are well known. Typically, a power fluid under relatively high pressure passes through a nozzle and aspirates into its stream a fluid to be pumped, for example, production fluid from an oil well. The combined stream enters the throat of a Venturi and passes into a diffusion chamber of the Venturi where the high velocity streams recover a static pressure head.

Production fluids generally have an appreciable solid content. Most common of the solid content is sand, which is highly erosive. The Venturi of a jet pump has a comparatively small passage, the throat, through which the power and well fluid streams pass at high velocity. The erosive power of solids at these high velocities is substantial. A prior art solution to these problems has been to fabricate Venturi throats and diffusion chambers out of ceramic materials because these materials resist erosion.

The Venturi of a jet pump used in a down hole location is additionally subjected to considerable mechanical stress. The pressure of well fluid at the formation may be about a thousand PSI. Such fluid acting radially inward on a ceramic Venturi opposes a radially outward pressure within the Venturi which can achieve a level of about six thousand PSI, with the net result that the ceramic Venturi is loaded in tensile hoop stress to a considerable degree.

It is well known that ceramic materials do not posses significant tensile stress resistance, but they do have a much greater resistance to compressive force than to tensile forces. Hence, it is desirable to impose a preloaded compressive stress on the ceramic element of a Venturi.

SUMMARY OF THE INVENTION

The present invention provides a jet pump with a Venturi chamber surface that is defined by a thin layer of relatively exotic ceramic or alloy materials having both high erosion resistance and high stress resistance. Such exotic materials can be successfully produced in the form of a brittle coating of a relatively few thousandths inch thickness by the chemical vapor deposition technique, which involves heating the substrate upon which the coating is to be applied to a temperature on the order of one thousand degrees C. Obviously, the substrate material must have a coefficient of thermal contraction compatible with that of the exotic materials so that the coating is not cracked and maintains its integral bond with the substrate during the cooling to ambient temperatures. In accordance with this invention, graphite is employed as the substrate material. However, it is well recognized that graphite has no significant resistance to stress, hence a brittle coating supported only by a mass of graphite would rapidly fail under the tensile hoop stresses produced in the Venturi of a down hole jet pump or due to handling abuse.

In accordance with the method of this invention, the graphite substrate is then removed by machining and/or oxidation to reduce the substrate to a relatively uniform thickness of less than 0.010 inches. This thin graphite substrate with the coating applied thereto is then positioned within a cylindrical mold cavity and the space therebetween is filled with a low melting, high elastic modulus material such as copper, aluminum, Kirksite, brazing alloys or a filled thermoplastic. This results in a cylindrical body having a coated Venturi interior surface. To provide the desired degree of tensile stress in the coating to permit it to withstand the stresses encountered in the operation of a down hole jet pump, the cylindrical mass is then encased in a jacket of steel or other high tensile strength material which is applied by heat shrinking around the cylindrical body, thereby producing a desired compressive hoop stress in the erosion resistant coating.

BRIEF DESCRIPTON OF THE DRAWINGS

DESCRIPTION OF THE PREFERRED EMBODIMENTS

Figure 1:
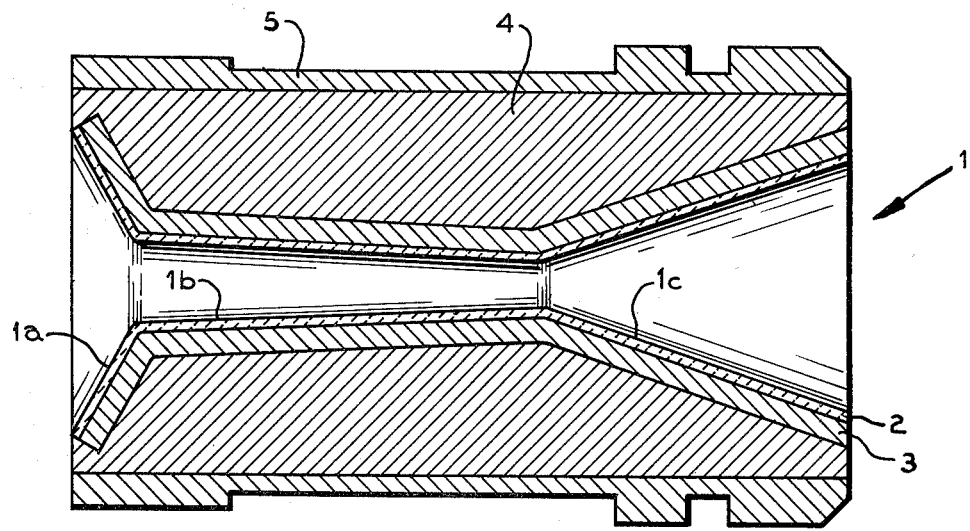
FIG. 1 is a schematic sectional view of the Venturi portion of a jet pump incorporating this invention.

Reference should be made to U.S. Pat. No. 4,135,861 to Brown et al. which discloses the general construction of a jet pump for down hole applications, such pump incorporating a Venturi chamber formed in a ceramic mass. For this reason, only the improved Venturi section incorporating this invention is disclosed in the drawings, but those skilled in the art will understand that it may be employed with any conventional jet pump.

The Venturi 1 has an inwardly flared inlet section 1a communicating with a reduced diameter, straight or slightly tapered throat section 1b and terminating in a diverging diffuser section 1c. The wall surfaces of the Venturi 1 are defined by a relatively thin coating or layer 2 of highly erosion resistant material. Such materials may be ceramics, such as silicon nitride ($Si_3N_4$), or titanium diboride ($TiB_2$), or other substances known for their erosion-resistant qualities.

The Venturi coating 2 is boned to a substrate of graphite 3 which has a thickness not in excess of 0.010 inches. Surrounding the graphite substrate 3 is a mass 4 of a high elastic modulus, low melting point material such as copper, aluminum, Kirksite, brazing alloys or a filled thermoplastic such as an epoxy resin with glass fiber or metallic filling. The assembly is completed by a heat shrunk sleeve or jacket 5 of steel or similar high tensile strength material. The degree of shrinking of jacket 5 is sufficient to produce a compressive hoop stress in the coating 2.

The described Venturi section may be inserted in any conventional pump and, due to the high erosion resistance of the relatively exotic materials employed in the coating 2, the surfaces of the Venturi will be highly resistant to erosion. Additionally, because of the compressive hoop stresses induced in the coating by the heat shrunk jacket 5, a significant pressure differential between the interior of the diffuser and the exterior of the jacket 5 may be sustained without injury to the coating 2. The assembly also protects the brittle coating 2 from injury due to handling.

Figure 2:
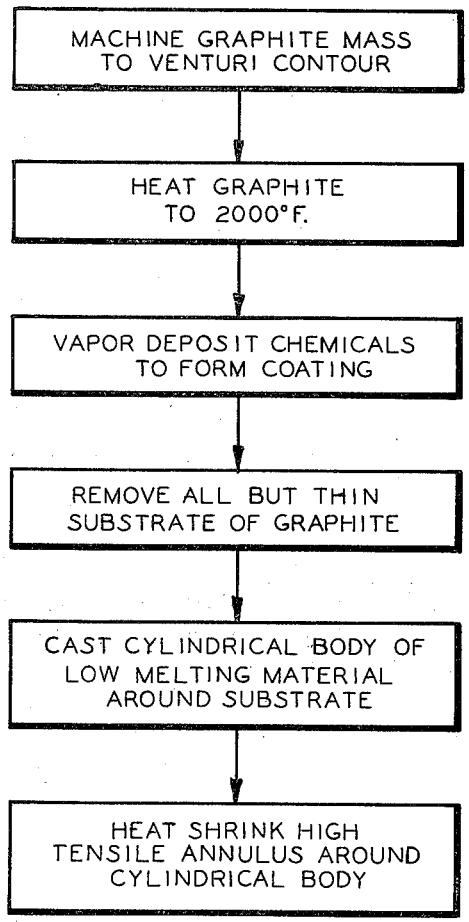
FIG. 2 is a block diagram illustrating the sequence of steps by which the Venturi pump section of FIG. 1 is produced.

Referring now to FIG. 2, the method of forming the ceramic Venturi incorporating this invention will now be described. A mass of graphite, which may conveniently be in cylindrical form and of a diameter approximating that of the high modulus material 4, is machined to produce an internal surface contour conforming to the desired contour of the Venturi, but the internal dimensions of the graphite contour are made a few thousandths of an inch larger than the desired dimensions of the ceramic coating.

The graphite mass is then heated to approximately one thousand degrees C., is inserted in an evacuated chemical deposition chamber and the chemical elements of the exotic coating are then introduced into such chamber in vapor form. These chemical vapors interact on the heated surfaces of the graphite mass to form the coating. The deposition process is continued until a coating on the order of one to five thousandths inches is produced. The graphite mass, with the internally applied coating, is placed in a retort under controlled conditions, and then permitted to cool. In such cooling, no significant stresses are induced in the coating because the coefficient of the thermal contraction of the graphite mass is substantially the same as that of the coating.

The graphite is then substantially all removed from the coating except a substrate of not more than 0.010 inches in thickness. Such removal may be done in any convenient manner, for example, by oxidation or by machining the external surface of the graphite mass followed by oxidation.

The Venturi-shaped coating 2 and graphite substrate 3 are then positioned within a cylindrical mold cavity which is filled with the low melting, high elastic modulus material 4. This assemblage is then permitted to cool. To induce compressive stresses in the assemblage, a jacket 5 of steel is shrunk around the cylindrical surface. Because of the malleable nature of the low melting material 4, the stresses induced by the heat shrunk jacket 5 are transmitted to the coating 2 and exist therein as a compressive hoop stress.

The jacket 5 is then assembled in appropriate relationship with the nozzle (not shown) of a jet pump and appropriate connections are made to the inlet passage 1a and to the end of the diffuser passage 1c to complete the jet pump assembly.

Although the invention has been described in terms of a specified embodiment which has been set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of making a Venturi chamber for a jet pump having a high erosion and stress resistant internal surface comprising the steps of: machining a graphite mass to produce an internal surface conforming in contour to the desired Venturi chamber but being a few thousandths of an inch larger in all internal dimensions; heating the graphite mass and depositing by the chemical vapor deposition technique a coating of a predetermined thickness on all said internal surfaces, said coating comprising an erosion resistant material produced by chemical reaction of vaporized chemical elements on the hot internal surface of the graphite mass; cooling the coated graphite mass; removing all of said graphite mass except for a substrate adjacent the coating; inserting the coating and substrate in a cylindrical mold cavity and filling the cavity with a low melting malleable material to produce a cylindrical body having a surface coated Venturi chamber supported therein; and heat shrinking an annulus of high tensile strength material around said cylindrical body to generate a compressive stress in said coating.

2. The method defined in claim 1 wherein said coating is selected from the group consisting essentially of silicon nitride.

3. The method defined in claims 1 or 2 wherein the graphite mass is heated to a temperature of about one thousand degrees C.

4. The method defined in claims 1, 2, or 3 wherein the low melting, malleable material comprises one selected from the class consisting essentially of copper, aluminum, Kirksite, brazing alloys and filled thermoplastics.

5. An improved jet pump comprising a hollow mass of graphite defining a Venturi chamber therethrough, a coating of chemical vapor deposited, erosion resistant material covering said Venturi chamber, said mass of graphite being reduced to an annular configuration after deposition of said coating having a wall thickness not in excess of 0.010 inches, a surrounding mass of low melting, high elastic modulus material cast around said annular graphite mass substrate having a cylindrical exterior surface, and an annulus of low elastic modulus, high strength material heat shrunk around said high elastic modulus material to produce a compressive force in said coating.

6. The jet pump defined in claim 5 wherein said coating material comprises silicon nitride.

7. The combination defined in claim 5 or 6 wherein the high modulus material comprises one selected from the group of copper, aluminum, Kirksite, brazing alloys and filled thermoplastic.

8. An improved jet pump comprising a Venturi chamber consisting of a coating of chemical vapor deposited, erosion resistant material having a thickness of about 0.015 inches, a graphite substrate supporting said coating and reduced to a thickness less than about 0.010 inches after application of said coating, a surrounding mass of a low melting, high elastic modulus material cast around the graphite substrate and having a cylindrical exterior surface, and an annulus of low elastic modulus, high strength material heat shrunk around said high elastic modulus material to produce a compressive force in said coating material.

* * * * *